(12) United States Patent
Cockayne

(10) Patent No.: US 8,116,825 B1
(45) Date of Patent: *Feb. 14, 2012

(54) TWO RADIO INTERFACE FOR MOBILE COMMUNICATION DEVICE FOR ELECTRONIC COMMERCE

(75) Inventor: William R. Cockayne, San Francisco, CA (US)

(73) Assignee: Qwikker, Inc., New York, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 12/245,035

(22) Filed: Oct. 3, 2008

Related U.S. Application Data

(63) Continuation of application No. 10/737,529, filed on Dec. 15, 2003, now Pat. No. 7,450,969, which is a continuation of application No. 10/395,813, filed on Apr. 24, 2002, now abandoned, which is a continuation of application No. 09/938,285, filed on Aug. 23, 2001, now abandoned.

(60) Provisional application No. 60/228,604, filed on Aug. 28, 2000.

(51) Int. Cl.
*H04B 1/38* (2006.01)
*H04L 29/08* (2006.01)
*H04L 12/58* (2006.01)
*H04W 4/00* (2009.01)
*G06F 15/16* (2006.01)

(52) U.S. Cl. .................. 455/566; 455/414.3; 455/412.1; 455/426.1; 709/200; 709/219

(58) Field of Classification Search ................ 455/414.3, 455/566, 412.1, 426; 709/219, 200
See application file for complete search history.

(56) References Cited

U.S. PATENT DOCUMENTS 5,793,413 A 8/1998 Hylton et al.
(Continued)

FOREIGN PATENT DOCUMENTS

GB 2 326 564 A 12/1998
(Continued)

OTHER PUBLICATIONS

Rauch, Christian et al., "Hybrid Mobile Interactive Services combining DVB-T and GPRS", In Proceedings EPMCC 2001, 4th European Personal Mobile Communications Conference (Feb. 20-22, 2001).

*Primary Examiner* — Temesgh Ghebretinsae
*Assistant Examiner* — Bobbak Safaipour
(74) *Attorney, Agent, or Firm* — Sughrue Mion, PLLC

(57) ABSTRACT

A mobile device (1) for electronic commerce. The device includes a mobile housing (2) and a microprocessor-based unit (6) coupled to a memory storage device (5) in the housing. The device has a power supply (3) that is coupled to the microprocessor unit while supplying power to all of the components. The device has one or more input controls (4) coupled to the microprocessor unit. The device also includes a wireless receiver (or transceiver) (7) and additional wireless transceiver (8) coupled to the microprocessor based unit, to the memory storage and to one or more antennas (9). The wireless receiver is adapted to receive information comprising text, graphics and sound from a wireless network. The wireless transceiver is adapted to send and receive text, graphics and sound from a wireless network. The device also has a display (11) and speaker (10) coupled to the housing and coupled to the microprocessor-based unit. An advertisement comprising the text, graphics and sound derived from the information can also be included. The information is outputted on the display.

4 Claims, 3 Drawing Sheets

Basic two-radio model

U.S. PATENT DOCUMENTS

| | | | |
|---|---|---|---|
| 5,812,930 A | 9/1998 | Zavrel | |
| 5,966,652 A * | 10/1999 | Coad et al. | 455/412.1 |
| 6,062,887 A * | 5/2000 | Schuster et al. | 439/218 |
| 6,084,528 A | 7/2000 | Beach et al. | |
| 6,118,824 A | 9/2000 | Smith et al. | |
| 6,157,630 A * | 12/2000 | Adler et al. | 370/338 |
| 6,205,473 B1 | 3/2001 | Thomasson et al. | |
| 6,711,418 B1 | 3/2004 | Wang et al. | |
| 7,010,501 B1 * | 3/2006 | Roslak et al. | 705/23 |
| 7,040,541 B2 * | 5/2006 | Swartz et al. | 235/472.02 |
| 7,343,317 B2 | 3/2008 | Jokinen et al. | |
| 2001/0042109 A1 * | 11/2001 | Bolas et al. | 709/219 |
| 2002/0001303 A1 * | 1/2002 | Boys | 370/352 |
| 2002/0046084 A1 * | 4/2002 | Steele et al. | 705/14 |
| 2002/0132575 A1 | 9/2002 | Kesling et al. | |
| 2003/0050058 A1 * | 3/2003 | Walsh et al. | 455/426 |
| 2003/0181201 A1 | 9/2003 | Bomze et al. | |
| 2004/0205106 A1 * | 10/2004 | Adler et al. | 709/200 |

FOREIGN PATENT DOCUMENTS

| | | |
|---|---|---|
| WO | 01/11833 A1 | 2/2001 |
| WO | 01/39576 A1 | 6/2001 |

* cited by examiner

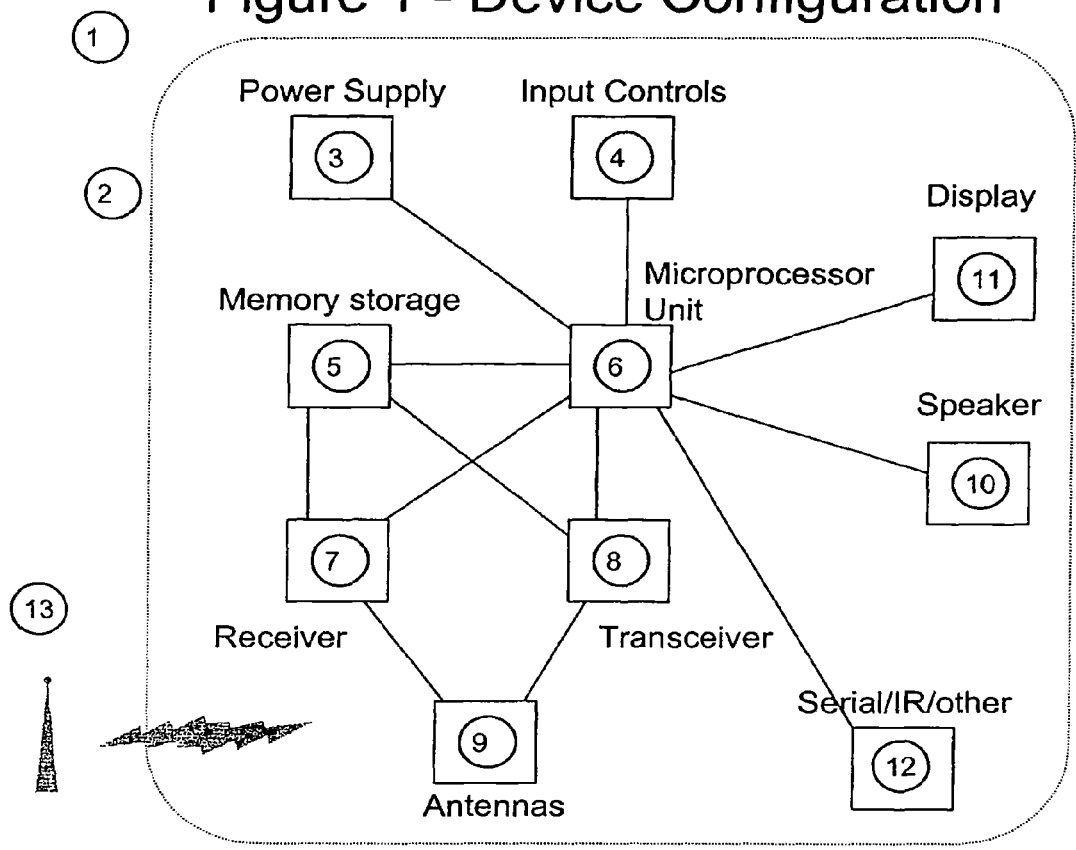

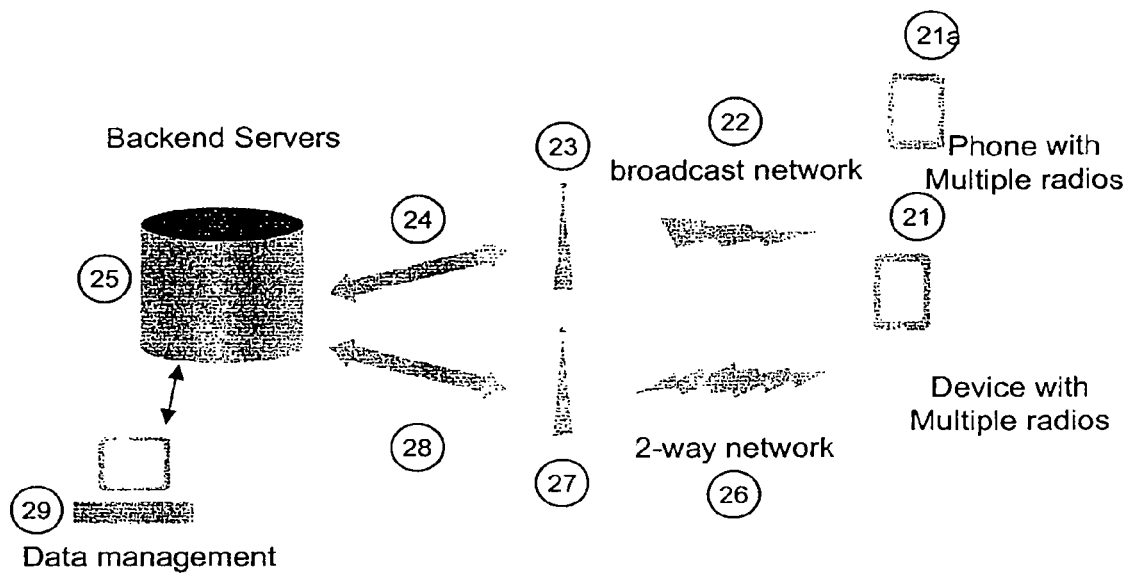
Figure 2 - Basic two-radio model

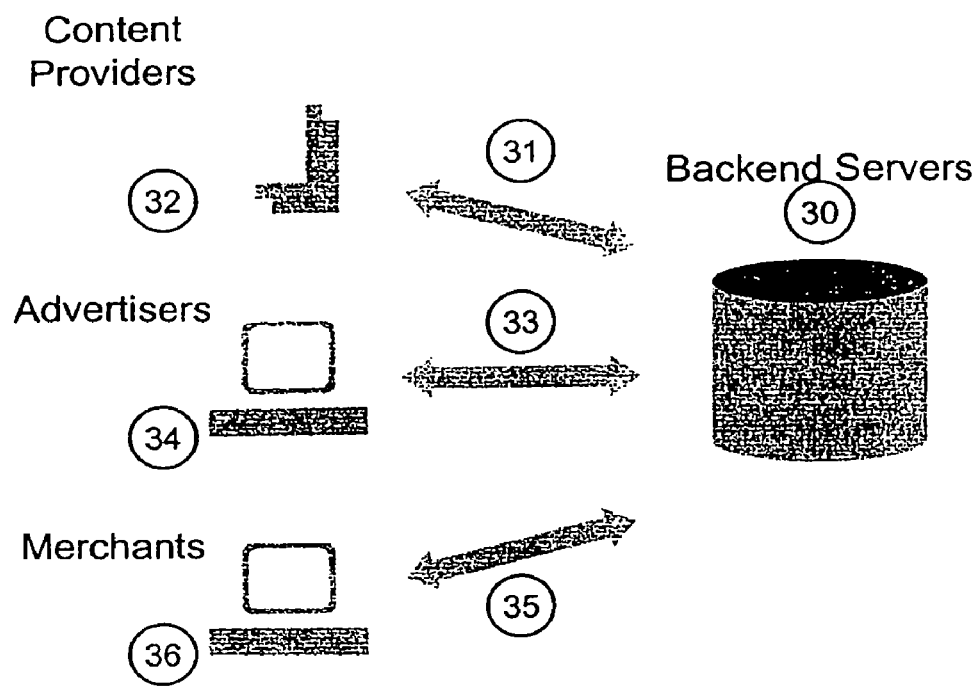
Figure 3 - Data for two-radio model

TWO RADIO INTERFACE FOR MOBILE COMMUNICATION DEVICE FOR ELECTRONIC COMMERCE

BACKGROUND OF THE INVENTION

The present invention relates generally to a mobile electronic communications. More particularly, the present invention provides a technique including a method for providing more efficient and cost-effective use of bandwidth through the differential use of two physical radio networks and interfaces. One of the networks can be used together to provide broadcast, multicast or anycast transmission or low-cost one-to-one transmission of information comprising text, graphics or sound to a mobile communication device. The second network can be used to provide higher cost one-to-one transmission of information comprising text, graphics or sound to the mobile communication device.

In an exemplary embodiment the two networks can be integrated at the network hardware and software layer into one device. In a preferred embodiment the two networks can be integrated at the network hardware and software layer in more than one device or computing system. In an exemplary embodiment, the information presented can be used to provide for-fee services, advertiser supported services or free services. Advertisements can be derived from sources that are regional, national, or global, or any combination thereof for sales of goods and/or services. In an exemplary embodiment, the advertisements include revenues, which are used to fund periodic service fees for a user's service for the mobile communication device. Merely by way of example, the present communication technique can also be applied to other fields such as business applications, electronic commerce, consumer safety, finance, and the like.

Telecommunication techniques have been around for many years. Most industrialized countries today rely heavily upon telephone to facilitate communication between businesses and people, in general.

Wireless communication techniques have replaced, in part, some of the land lined based communication systems. These wireless communication techniques include cellular phones, radios, pagers, and the like. Conventional wireless communication techniques are generally limited in the way and type of information they transfer. That is, these wireless communication techniques are limited to transferring voice. There are some techniques that transfer news information such as weather, sports, and the like to a user. These techniques are often expensive, and have been limited in success. A user of such wireless technique often would like such news information, but does not way to pay the periodic service charge for it. Accordingly, conventional wireless techniques are often limited in the amount of usable information other than voice they transfer.

Therefore what is needed is mobile communication technique that utilizes wireless transfer of digital information, which overcomes the problems and disadvantages associate with conventional device and wireless systems.

SUMMARY OF THE INVENTION

According to the present invention, a technique including a method for using a mobile communication device is provided. In an exemplary embodiment, the present invention provides a technique for using two distinct radio interfaces to transmit and receive digital information. By way of the present technique, numerous mobile units will be distributed and used throughout a selected region or nationally or globally. The invention relates to a data transmission method in a wireless communications system comprising in each cell at least one base station communicating with mobile stations within its coverage area, in which method extra known reference information is added to a transmit signal. To enable an efficient use of bandwidth, information that is of interest to multiple users is broadcast over a dedicated channel to the receiver interface and the separate transceiver interface is used for communicating high value, low volume information in both directions with the device.

In a specific embodiment, the invention provides a method for communicating to a remote mobile device using a lower cost network and a higher cost network. The higher cost network is relative in cost to the lower cost network. The method includes receiving information comprising text, graphics and sound from a first wireless network at a wireless receiver. The wireless receiver is coupled to a microprocessor based unit coupled to a mobile housing. The first wireless network can be a low cost one-way network. The method also includes sending information comprising text, graphics and sound on a second wireless network by a transceiver coupled to the microprocessor. The second wireless network is a higher cost two-way network relative to the low cost network. The method also includes displaying information selected from the transceiver or the receiver. The information is stored in memory coupled to the microprocessor unit.

In a preferred embodiment the two wireless networks can be integrated together via hardware or software at the device and backend network layers. The two networks can be utilized to provide more efficient use of wireless bandwidth and more cost-effective access to wireless information for the device user, the carrier, a content provider, a services provider, or a party to a transaction.

Digital information can be sent down a wireless one-way network with no acknowledgement of the data receipt.

Information can be sent down a wireless one-way network with an acknowledgement of data receipt via the second network, said network having the ability to send information from the device to the backend.

Information can be sent down a wireless two-way network with no acknowledgement of the data receipt.

Information can be sent down a wireless two-way network with an acknowledgement of data receipt via the two-way network.

The transceiver can be used to register the location of the user at which point the backend data systems sends a response to the transceiver or receiver to modify the tuning frequency for the receiver.

In a preferred embodiment the two networks can also be used together for control of the device or the radio characteristics.

Digital information can be sent down the two-way wireless network that provides a new frequency for the one-way network radio interface in the device to be tuned to.

Information can be sent down the two-way wireless network that provides a software update for the one-way network radio interface.

Information can be sent down a one-way wireless network that provides a new frequency for the two-way network radio interface in the device to be tune to.

In a preferred embodiment the two networks can be utilized to provide more reliable access to wireless information.

The one-way wireless network can be used to send general information to the device when there is no access to the two-way network because of a lack of coverage.

The one-way wireless network can be used to send critical information to the device when the device seems inaccessible via the two-way network, but the device may be within coverage of the one-way network.

The two-way wireless network can be used to send general information to the device when the device has not received the information previously over the one-way network.

The transceiver can listen to its network while the receiver can be listening to or receiving information on its network.

The transceiver can be used to turn off the receiver interface when there is no coverage in the area.

BRIEF DESCRIPTION OF THE DRAWINGS

FIG. 1 is a simplified block diagram of a mobile communication device according to an embodiment of the present invention;

FIGS. 2-3 are simplified flow diagrams illustrating methods according to embodiments of the present invention.

DESCRIPTION OF THE SPECIFIC EMBODIMENTS

According to the present invention, a technique including a method for using a mobile communication device is provided. In an exemplary embodiment, the present invention provides a technique for delivering cost-effective network usage through the utilization of two network interfaces. By way of the present technique, numerous mobile units will be distributed and used throughout a selected geographic region, nationally, or globally. In other embodiments, the present invention provides a novel technique for providing low-cost or no fees for services over a wireless network to a mobile communication device.

FIG. 1 is a simplified block diagram 1 of a mobile communication device according to an embodiment of the present invention. This diagram is merely an example, which should not limit the scope of the claims herein. One of ordinary skill in the art would recognize many other variations, modifications, and alternatives. The diagram 1 includes a variety of features such as a mobile communication device 2 which couples to a server (or database). The mobile communication device has a memory storage device, a processor, operating instructions, a wireless receiver or transceiver, display, and input controls.

As shown in more detail in FIG. 1, the mobile device includes a housing 2, which houses a display 11. The device may include a speaker 10, according to a specific embodiment. The housing also includes switches or buttons for providing operation to the device 4. The housing is often made of a suitable resistant material to mechanical, chemical, thermal, or electrical influences. The housing includes the display, which has a browser device. The browser device has a plurality of icons, which are used for selections. The browser device can also include a region for an advertisement, which can be displayed and deleted. The browser also includes many other features, which are described herein.

The mobile device also includes hardware and software components in the housing. As shown, the hardware components generally include a central processing or microprocessing unit 6. Here, the processor should be sufficient to operate and process a discrete amount of information. Other functionality of the mobile communication device are also overseen by the processor. The processor can be a microprocessor, a digital signal processor, a microcontroller, or the like. The processor includes a clock speed of about 2 MIPS and greater or about 100 to about 500 to about 1,000 MIPS and greater. As merely an example, the processor is a Motorola DragonBall product made by a company called Motorola, but can also be others. Alternatively, the processor can be one made from a company called NEC Corporation, Texas Instruments, Intel and others. Of course, the type of processor used depends upon the application.

The processor oversees and couples to a variety of elements. The elements include, among others, a display 11 which couples to the CPU through a display controller. Physical controls 4 such as those buttons noted couple to the CPU through input controller. The CPU also couples to a memory device 5 through a memory controller. In a specific embodiment, the memory device should have a suitable amount of memory capacity. Here, the memory device includes at least one megabyte, or four megabytes, or sixteen megabytes, or sixty-four megabytes of programmable memory. Here, the programmable memory can be selected from a suitable lower power memory with high capacity such as a dynamic random access memory ("RAM"), a static random access memory ("SRAM"), a "Flash" memory, and/or a ferroelectronic random dom access memory ("FRAM"). According to the present invention, the memory should include enough memory to operate while not incurring large costs.

The CPU and other elements derive power from power source 3. The power source is often a suitable battery, which can be rechargeable. The battery can also be disposable. The CPU communicates to external devices through a variety of interfaces. The interfaces can include, among others, a serial interface and an infrared interface 12. Other types of interfaces such as voice, parallel, and the like can also be included. The CPU receives (and transmits signals) through an RF front end 7, which couples through a tuner and a decoder to an antenna 9. The CPU receives (and transmits signals) through a second RF front end 8, which couples through a tuner and a decoder to an antenna 9. The CPU can also couple to other elements in other ways.

In a specific embodiment, both RF front ends generally receive a wireless signal that contains advertisement information from a wireless broadcast unit 13, which is also coupled to the database. The wireless signal utilizes an RF or IR protocol, but can also be others. The wireless broadcast unit can be in the form of a cellular disk, a satellite disk, a totem pole, and others. The wireless signals can be from an RF network, which is made by Motorola or Nortel, but can also be others. In a specific embodiment, one of the RF units receives a wireless broadcast and transfers the information to the device on an individual, a group, or a wide scale broadcast. The information is transferred to the wireless transfer unit from the backend database or web server, as noted. In an embodiment, the information can be formatted for transmission using data movement and encoding tools.

FIGS. 2 and 3 are embodiments of the backend database, wireless networks and information movement for the device.

In another aspect, the advertisements and information can also be viewed by the mobile communication device user operating another device utilizing a browser 21A. As merely an example, the user views the information on a smart phone, smart pager, or in another form of advertising browser. The information are managed, formatted, or modified at the back end utilizing tools operating on a personal computer, either within a network browser or standalone 29. In FIG. 3 the information is correlated with other information that is obtained from external sources 32, that is stored on backend servers 30 as well as being generated on 34, 36. The advertisements can also be created, entered, or modified on a computer utilizing a network browser or standalone code that is utilized directly by the advertising purchaser 34.

The present invention also provides techniques for creation, aggregation, modification, formatting, compression, encryption, transfer, wireless transmission, receipt, decompression, verification, processing, storage, display, and removal of the advertisements and information from the mobile communication device. The system is primarily composed of a set of backend software data creation and manipulation tools, a backend storage system, such as a database or web server, a set of tools for performing the necessary manipulations of the information for transfer to the mobile communication device, a wireless network for the transfer of the information, and the mobile communication device. The mobile communication device utilizes the components to operate on the information to facilitate its display to the user.

The wireless receiver or transceiver of the device receives the wireless signal, which is then processed by the decoder, which could be integrated into the processor or could be a separate chip that is used in conjunction with the processor, then transfers the information to the processor, which utilizes its operating instructions, written in a standard computer language such as assembly, C, C++, Java, Pascal, Visual Basic, Perl, etc., to verify the information using digital encryption, signature, or copyright techniques, and to process any meta information, such as where to place it in the memory storage area or what other information it should be displayed in conjunction with, for example having an advertisement for a restaurant being displayed to the user when the user is looking for restaurants, and then placing the advertisement and related information into the memory storage area for later display to the user. The information can later be retrieved from the memory storage area by the processor and presented to the user on the mobile communication device's display when the user is looking for information correlated with or directly related to information.

In a specific embodiment, the mobile communication device is provided with a radio frequency tuner, antenna systems and decoder so as to receive information via a wireless radio frequency connection with the external systems, which can then transfer information to the mobile communication device, which can then be acknowledged or begin a request for more information to be completed over the second interface. In this manner, the mobile communication device can use utilize a tuner to monitor frequency modulation ("FM") or amplitude modulation ("AM"), ERMES, POCSAG, FLEX, ReFLEX, RAM, GSM, PCS, PHS, CMDA, CDMA2000, WCDMA, TDMA, 3G, Bluetooth, Piano, Jini, iMode, GPRS, UMTS, EDGE, 4G, etc, to select a particular frequency to be monitored. The mobile communication device can thus discriminate the frequency spectrum in order to detect the monitored frequency for communication with the mobile communication device. The tuner can support the ability to monitor and search through a statically or dynamically defined frequency space in order to find and utilize the exact frequency that the data is being transferred on. The device can utilize multiple tuners to support the receipt of information on multiple incompatible networks, thereby providing more extensive coverage for the wireless signal data; the incompatible networks operating in the same, partially overlapping, or totally distinct frequency spaces. In a preferred embodiment the device can utilize multiple radio interfaces in order to support this multiple tuner feature to support the receipt of information across entirely incompatible wireless networks, providing more extensive wireless coverage for the device, the incompatible networks operating in the same, partially overlapping, or totally distinct frequency spaces. As examples, the device can try receiving or sending information over the preferred network interface while the device is out of coverage for said network, at which point the device attempts to send the information over the second network interface, whose network does have coverage. In a preferred embodiment the device can use one of the network interfaces as a receive-only network when it is in coverage and then use the second network as a two-way network and acknowledge or complete the information that is received via the receive-only interface.

In a specific embodiment, the mobile communication device can have an area of insertion for a memory storage device, such as a smart card, smart coin, or memory stick, etc, to provide the device with advertisements, additional information on how to obtain or correlate advertisements over the wireless network, or other types of information that can be used by the mobile communication device for display to the user. Further this memory storage device can contain new versions of the code required to operate the mobile communication device or to change the application code on the device.

In a specific embodiment, the mobile communication device can utilize internal code or code added to the device through the use of a memory storage device to act as a debit card, credit, or barter system. In this configuration, the device carries the requisite information to verify the identity of the user using a secure method such as encryption or signatures and to support financial transactions by the user. The device could also contain the required information to allow for the further verification of the user, which then allows the user to perform transactions. Other possible formats for information that the device would carry for verification are encoded voice data for the user, physical encoding characteristics such as fingerprint information or optical verification, as well as digital signatures to verify and secure this and any other stored information. In this example, the identity of the user and the associated financial information such as a credit card number would be held on the mobile communication device and would be transferred by the device to the second party in the transaction is the company with which the financial transaction is being consummated.

A further embodiment of the of the method supports the use of the mobile communication device to function as a credit, debit or barter system that contains routing and verification information that allows the mobile communication device to act as a personal key between the second party or company with which the transaction is being performed and the user's financial institution or responsible third-party. The device can act as a key to be referenced during the setup, actual transaction, and tear-down between the two above systems, or could act as the conduit between the two systems allowing for another possible layer of inter-mediation between the two establishments. The device would also contain information that allows for verification of the information being presented to multiple parties based on a secured and trusted third-party system.

In a further specific embodiment, the mobile communication device is provided with only a minimal amount of memory or processing power or a different wireless receiver or transceiver, such that the device can be manufactured and sold at low cost. The device can then be sold to the consumer at a lower cost or given away to the consumer such that the costs associated with the device itself are covered by the receipt and display of advertisements by the device. In this embodiment, the user is more prone to purchase or accept and use the device in normal activities in return for allowing additional advertisements to be displayed. The general population will see a higher level of acceptance due to the lowered or non-existent cost associated with the use of the device and the information that is presented thereon.

In a further embodiment, the wireless transfer of information to the device can be performed on an individual, group, or broadcast basis over one, either or both network interfaces. Alternatively, the wireless receiver or transceiver can actually by composed of multiple components such that the wireless information can be transferred to the device over multiple radio frequencies, multiple protocols, utilizing different carries (inter-carrier) in different regions (intra-country or inter-country), or using infrared. The advantage of this configuration is to allow the mobile communication device to utilize the lowest cost network available or to be transported throughout multiple regions or countries that utilize different frequencies, protocols, methods, or companies to support wireless transfer of information and advertisements.

In a specific embodiment, the receipt, display, and later removal of information from the wireless network for viewing by the user supports the wireless costs associated with an electronic commerce transaction performed on the mobile communication device over a wireless or wired network which may not allow for advertisement information to cover the recurring or per-packet charges of all of wireless data. In the model the multiple network interfaces can be utilized to deliver the advertisement information over the network that incurs the lowest cost to all parties involved in the transaction. Also in the model, the user utilizes the mobile communication device and the associated wireless network to contact an electronic commerce company and all information transferred over the network from or to the device is paid for by the electronic commerce company or its associated proxy partners in return for the transfer and display of advertisements maintained by the electronic commerce company. For example, an electronic commerce company can measure the amount of data that is transferred to the mobile communication device as it leaves the electronic commerce site and calculates the probable, predicted, or exact costs associated with the wireless transfer of this information to the user. Continuing the example, electronic commerce company can track this cost to the user and apply credit to the user's associated online account (with the electronic commerce company or the wireless network provider) or apply this credit to the user's next purchase as facilitated by an online payment system using debit or credit systems.

In yet another embodiment, the wireless receiver or transceiver can be supported coupled with a wire connection, serial, Ethernet, etc., for the transfer of information or advertisements to the mobile communication device. Utilizing the wire network, the mobile communication device operates as if the information is being received from the wireless network, taking into account the different power, connection, and protocol requirements and allowing for additional operations to be performed on the information to allow for verification of the information being transferred to the device. The two-way network can also be used to acknowledge the receipt and storage of the information via the wire connection. As an example the wireless network can be used to send display information such as the time displayed and the time duration of the display to the network for tracking or storage of usage of the information.

A further embodiment allows for the display of the information or advertisements or related information to the user of the mobile communication device while the user is operating on another networked system, such as a computer utilizing a browser, a handheld computer utilizing a browser, a pager receiving wireless information, a cell phone receiving a wireless signal, or a smart phone receiving a message or utilizing a browser, etc. Further details of the present invention will be described in reference to the Figs. below. These details are carried out using a combination of hardware and/or software, which includes computer codes, for example.

Although the above has generally been described in terms of specific hardware and methods, it would be recognized that many other types of hardware and methods could be used. For example, any of the functionality above can be further integrated or even separated in terms of hardware. Alternatively, the functionality can be further integrated or even separated in terms of software. Alternatively, the functionality can be further combined in terms of hardware and software. The functionality can also be separated in terms of a combination of hardware and software. Depending upon the application, other variations can exist.

Although the above has generally described the present invention according to specific systems, the present invention has a much broader range of applicability. In particular, the present invention is not limited to a particular kind of device, but can be applied to virtually any wireless or wired device where an understanding about the workings desired. Thus, in some embodiments, the techniques of the present invention could provide information about many different types of cells, substances, and genetic processes of all kinds. Of course, one of ordinary skill in the art would recognize other variations, modifications, and alternatives.

What is claimed is:

1. A mobile device for electronic commerce, the device comprising:
    a mobile housing;
    a microprocessor based unit coupled to a memory storage device in the housing;
    a display coupled to the housing and coupled to the microprocessor based unit;
    a wireless receiver coupled to the microprocessor based unit, the wireless receiver being adapted to receive broadcast information that is of interest to multiple users from a lower cost one-way wireless network, the broadcast information being derived from an information server; and
    a wireless transceiver coupled to the microprocessor based unit, the wireless transceiver being adapted to send an acknowledgment of display of the broadcast information to the information server if the broadcast information is displayed by the mobile device, the acknowledgment of display is sent on a higher cost two-way wireless network that provides one-to-one transmission, and further adapted to send and receive second information on the higher cost two-way wireless network, a higher cost of the higher cost wireless network being relative to a lower cost of the lower cost wireless network.

2. A mobile device for electronic commerce, the device comprising:
    a mobile housing;
    a microprocessor based unit coupled to a memory storage device in the housing;
    a wireless receiver coupled to the microprocessor based unit, the wireless receiver being adapted to receive broadcast information that is of interest to multiple users from a lower cost one-way wireless network, the broadcast information being derived from an information server;
    a wireless transceiver coupled to the microprocessor based unit, the wireless transceiver being adapted to send an acknowledgment of storage of the broadcast information to the information server if the broadcast information is stored by the device, the acknowledgment of storage is sent on a higher cost two-way wireless network that provides one-to-one transmission, and further adapted to send and receive second information on the higher cost two-way wireless network, a higher cost of the higher cost wireless network being relative to a lower cost of the lower cost wireless network; and a display coupled to the housing and coupled to the microprocessor based unit.

3. A method for communicating to a remote mobile device using a lower cost one-way network that provides broadcast transmission to a plurality of users and a higher cost two-way network that provides one-to-one transmission, a higher cost of the higher cost network being relative to a lower cost of the lower cost network, the method comprising:

receiving broadcast information that is of interest to multiple users from a first wireless network at a wireless receiver, the wireless receiver coupled to a microprocessor based unit coupled to a mobile housing, the first wireless network being the lower cost one-way network, the broadcast information being derived from an information server;

sending second information on a second wireless network by a transceiver coupled to the microprocessor, the second wireless network being the higher cost two-way network;

receiving the second information on the second wireless network by the transceiver;

displaying the broadcast information and/or the second information selected from the transceiver or the receiver; and sending an acknowledgment of display of the broadcast information from the transceiver to the information server if the broadcast information is displayed.

4. A method for communicating to a remote mobile device using a lower cost one-way network that provides broadcast transmission to a plurality of users and a higher cost two-way network that provides one-to-one transmission, a higher cost of the higher cost network being relative to a lower cost of the lower cost network, the method comprising:

receiving broadcast information that is of interest to multiple users from a first wireless network at a wireless receiver, the wireless receiver coupled to a microprocessor based unit coupled to a mobile housing, the first wireless network being the lower cost one-way network, the broadcast information being derived from an information server;

sending second information on a second wireless network by a transceiver coupled to the microprocessor, the second wireless network being the higher cost two-way network;

receiving the second information on the second wireless network by the transceiver;

sending an acknowledgment of storage of the broadcast information from the transceiver to the information server if the broadcast information is stored at the remote mobile device; and displaying the broadcast information and/or the second information selected from the transceiver or the receiver.

* * * * *